United States Patent
Czudak et al.

(10) Patent No.: US 7,538,910 B2
(45) Date of Patent: May 26, 2009

(54) SYSTEMS AND METHODS FOR USING EMBEDDED METADATA IN A PRINT JOB

(75) Inventors: John C Czudak, Lakeville, NY (US); Patrick J Waara, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 965 days.

(21) Appl. No.: 11/012,696

(22) Filed: Dec. 16, 2004

(65) Prior Publication Data

US 2006/0132825 A1     Jun. 22, 2006

(51) Int. Cl.
- G06F 15/78 (2006.01)
- G06F 15/82 (2006.01)
- G06T 1/00 (2006.01)
- G05B 13/00 (2006.01)
- G06K 5/02 (2006.01)
- G06K 15/02 (2006.01)
- H04N 1/387 (2006.01)

(52) U.S. Cl. .............. 358/3.24; 358/1.15; 358/1.9; 358/1.18; 358/406; 358/434; 358/453

(58) Field of Classification Search .............. None
See application file for complete search history.

(56) References Cited

U.S. PATENT DOCUMENTS

| | | | |
|---|---|---|---|
| 5,778,377 A * | 7/1998 | Marlin et al. | 707/103 R |
| 6,539,370 B1 * | 3/2003 | Chang et al. | 707/2 |
| 2004/0066527 A1 * | 4/2004 | Kloosterman et al. | 358/1.15 |
| 2005/0125728 A1 * | 6/2005 | Peiro et al. | 715/523 |
| 2007/0236723 A1 * | 10/2007 | Gaertner et al. | 358/1.15 |

* cited by examiner

*Primary Examiner*—Twyler L Haskins
*Assistant Examiner*—Myles D Robinson
(74) *Attorney, Agent, or Firm*—Oliff & Berridge, PLC

(57) ABSTRACT

A printing system includes a memory that stores information including at least metadata, a printer and a controller that controls the printing system to embed the metadata into a data stream for the print job. After the controller controls the printer to print the print job, the controller controls the printer to reprint a portion of the print job based on the embedded metadata if the printing of the print job is not acceptable. A method of using a printing system includes a storing information including metadata, controlling the printing system to embed the metadata into a data stream for the print job and reprinting a portion of the print job based on the embedded metadata if the printing of the print job is not acceptable.

15 Claims, 7 Drawing Sheets

SYSTEMS AND METHODS FOR USING EMBEDDED METADATA IN A PRINT JOB

BACKGROUND OF THE INVENTION

1. Field of Invention

Printing of documents and more specifically to systems and methods for embedding metadata into print jobs.

2. Description of Related Art

Printing of both fixed data and variable data is often required with printing applications. The phrase "fixed data," as used herein, may refer to data that remains constant over a plurality of documents in a project. A project may refer to one or more documents having the same fixed data. The phrase "variable information or data," as used herein, may refer to information or data that varies between documents in a project. A document may refer to one or more pages in a project corresponding to a set or record of variable data. Projects containing both fixed and variable data may include data for personalized direct mailing documents, business forms, custom calendars, personalized checks, and the like. A sample set is each unique document contained within the print job. The sample set allows a printing system to digest a stream of documents and know where each documents starts and stops within the data stream.

Technological advancements in the speed, cost, and quality of digital production color equipment are driving the evolution of variable information printing. Today, full-color variable information printing represents a modest portion of the full-color impressions produced on digital production equipment, but its potential for growth is enormous. Variable information print jobs may produce a large group of similar documents, each documents containing custom content interspersed with repeated, static information. The pages of the print job may be composed of text, graphics, and images that can be unique to just that copy, identical on every copy, or used on some copies of the document but not on others.

Variable information applications can be demanding. They can call upon a full range of resources and may require careful coordination between the printer, designer, and client. Variable information printing also adds the critical dimension of data management, which is a key differentiating requirement from static applications. The content of variable information jobs, however, can vary from document to document and from page to page, severely burdening the controller. Full-color variable information applications further compound this challenge since they contain massive quantities of data for the controller to process and transfer to the printer.

If one of the sample sets is damaged during production, it is difficult and sometimes impossible to recreate the damaged sample set without reprinting the entire project. Thus, the recovery process may require generating a new variable information job containing the lost sample set. Generating a new variable information job in conventional imaging systems may be the only option available when the sample set is damaged because the conventional systems cannot determine which pages of the original job correspond to the lost sample set in order to only print the damaged pages of the original print job.

Because of the complexity of variable information print jobs, damaged sample sets may improperly alter the final product. Thus, there is a need to determine which pages of the original job correspond to a damaged or lost sample set in order to only print those pages of the original print job instead of generating the entire variable information job. Furthermore, there is also a need for improved efficiency and speed with variable information print jobs, while maintaining high quality print jobs.

SUMMARY

A printing system includes a memory that stores information including at least metadata, a printer and a controller that controls the printing system to embed the metadata into a data stream for the print. After the controller controls the printer to print the print job, the controller controls the printer to reprint a portion of the print job based on the embedded metadata if the printing of the print job is not acceptable.

A method of using a printing system includes storing information including metadata, controlling the printing system to embed the metadata into a data stream for the print job and reprinting a portion of the print job based on the embedded metadata if the production of the print job is not acceptable.

When creating a variable information print job, metadata may be embedded into a data stream for each sample set so that the entire variable information print job communicates not just the pages of content for each sample set, but also the record data that was used to generate the pages of content for each sample set. Metadata may be defined as raw data containing information about a print data stream that corresponds to a print job. For example, the metadata may be raw original data that is associated with a sample set level or a page level, e.g., a coversheet of the sample set. With the metadata embedded in the print job, and then transmitted along with the print job, it becomes possible to create a new variable information print job from the original variable information print job that will contain only the sample sets that need to be regenerated should data, e.g., one or more of the sample sets, become damaged or lost.

BRIEF DESCRIPTION OF THE DRAWINGS

Various exemplary embodiments of the systems and methods will be described in detail, with reference to the following figures, wherein.

DETAILED DESCRIPTION OF PREFERRED EMBODIMENTS

Systems and methods for using embedded metadata in a print job and enhancing the features available for reprinting the print job are discussed below. For reasons of convenience, the examples below will be discussed using a variable information print job as the print job. However, it should be appreciated by one skilled in the art that the systems and methods may be used with any known printing system and print job without departing from the spirit and scope of the invention.

Figure 1:
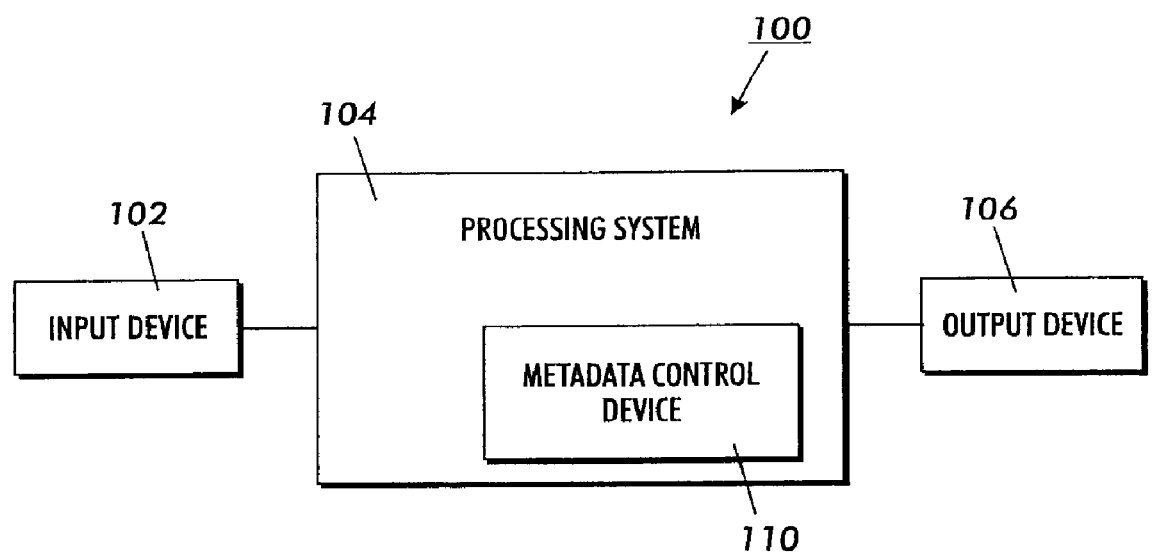
FIG. 1 is an exemplary diagram of a printing system that may be controlled to use metadata in a print job.

FIG. 1 is an exemplary diagram of a printing system that may be controlled to embed metadata within the data stream for a print job. As shown in FIG. 1, the printing system 100 may include an input device 102, and processing system 104 and an output device 106. The input device 102 may be, for example, a display, keyboard, mouse, trackball, keypad, touch screen, kiosk or the like to permit a user to view a user interface and control menu selections or layout commands that command the processing system 104. The input device 102 may also be computer or scanner, camera or any other device connected to the processing system 104 and that captures, creates or imports an object that may be converted to an image. The output device 106 may be, for example, a printer used to print out a print job. The output device 106 may also be a display or monitor.

Figure 2:
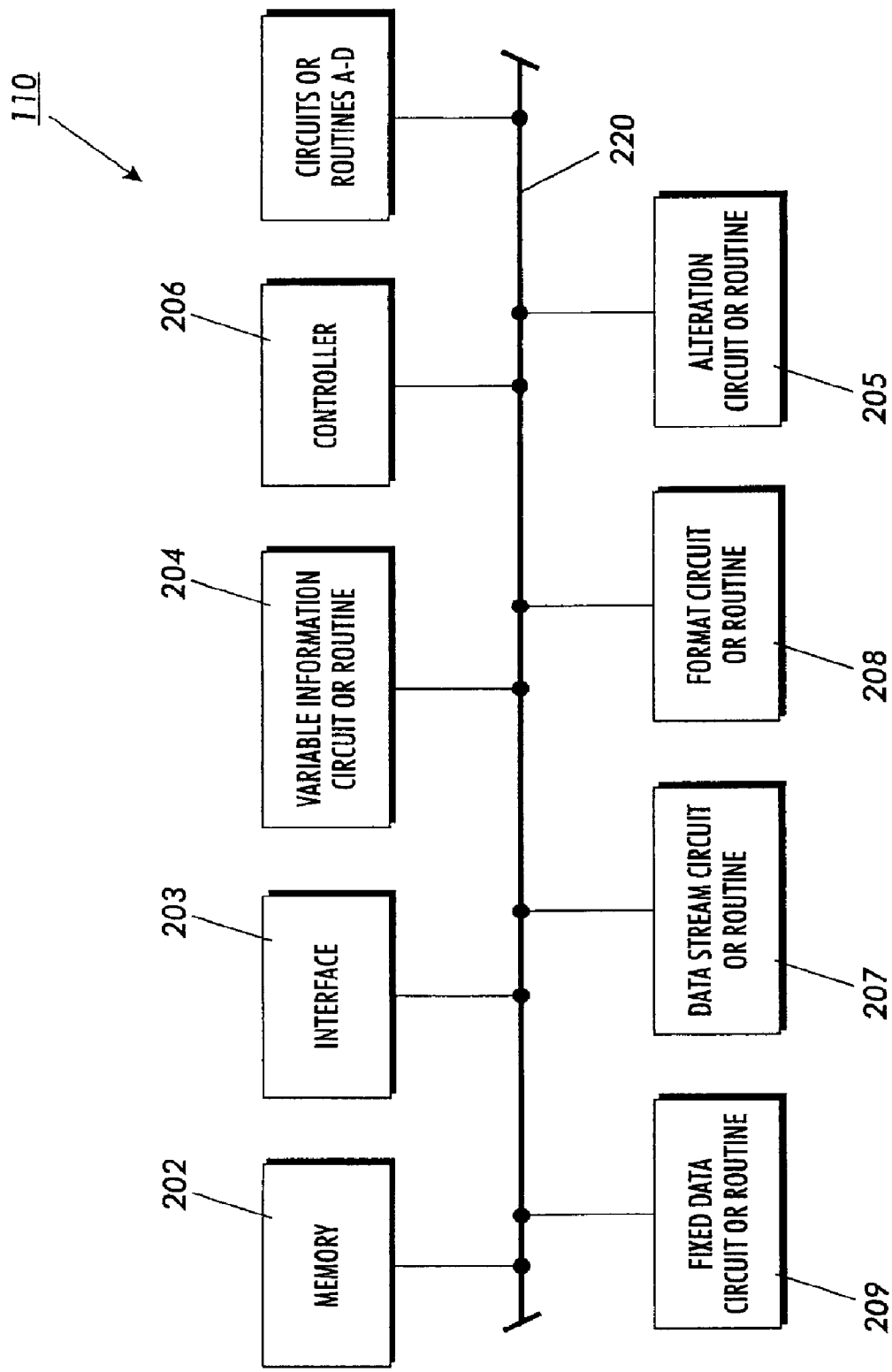
FIG. 2 is an exemplary detailed diagram of the metadata control device shown in FIG. 1.

The processing system 104 may be any system that processes data. For example, the processing system 104 may be a computer. The processing system 104 may also be a personal computer, mainframe, microcomputer, program controller, various devices coupled over a network or any other device or devices capable of carrying out the processing for embedding the metadata within the data stream and recreating the data. The processing system 104 may include a metadata control device 110 that may control the metadata to be included or embedded with the data stream of the print job. As shown in FIG. 2, the metadata control device 110 may include a memory 202, interface 203, variable information circuit or routine 204, alteration circuit or routine 205, a controller 206, a data stream circuit or routine 207, a format circuit or routine 208 and a fixed data circuit or routine 209. The metadata control device may optionally include circuits or routines A-D. Each of the components 202-209 and A-D may be connected via a bus 220. The memory 202 may be any storage device (which may include large databases shared in a variety of memory types such as disks, tapes, RAM, etc.), and may be a database or multiple databases. The memory 202 may store, for example, the fixed data, variable information and metadata.

Figure 5:
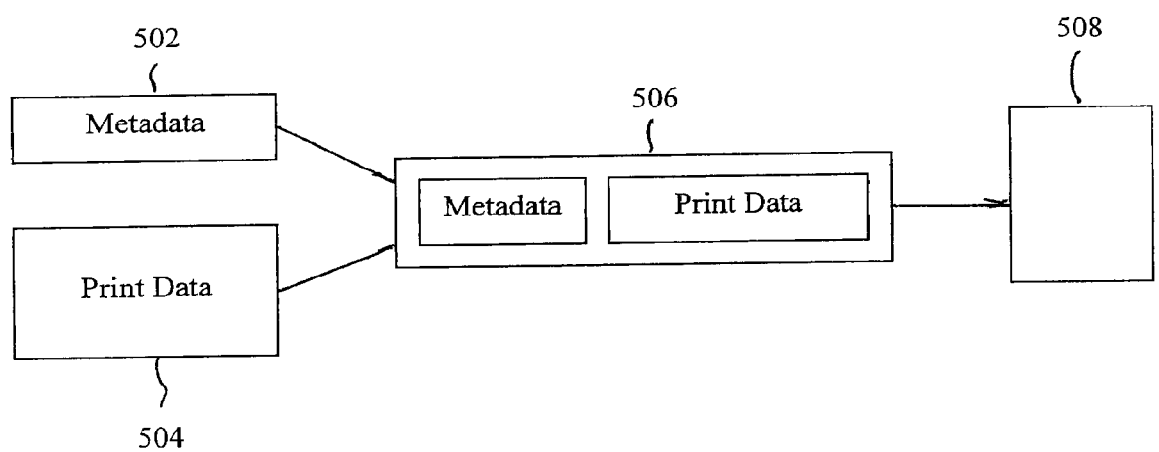
FIG. 5 is an exemplary diagram showing a print data stream.

The variable information circuit or routine 204 may be controlled by the controller 206 to include information or data in the print job that varies between documents in the project. The alteration circuit or routine 205 may be controlled by the controller 206 to enhance the data within the print job, e.g., a sample set, by associating metadata with the sample sets by embedding the metadata within the print job. For example, FIG. 5 shows the merging of metadata 502 and print data 504 to produce print data stream 506 that is used to produce output 508. While FIG. 5 shows metadata 502 being placed after print data 504 in print data stream 506, it is to be understood that metadata 502 can be placed before print data 504, after print data 504, or that meta data 502 and print data 504 could be alternately provided in portions of the data stream. The data stream circuit or routine 207 may be controlled by the controller 206 to process the fixed and variable information and convert the variable information into a desired format, if necessary, for processing by the processing system 104. The format circuit or routine 208 may be controlled by the controller 206 to create a layout for the project that determines an appearance of the documents and stores the layout as a template used for printing the documents. The fixed data circuit or routine 209 may be controlled by the controller 206 to embed fixed data into the data stream of the print job. The interface 203 may facilitate communication between the components 202-209 using the bus 202.

In the illustrated embodiments, the controller 206 may be implemented with a general purpose processor. It will be appreciated by those skilled in the art that the controller 206 may be implemented using a single special purpose integrated circuit (e.g., ASIC) having a main or central processor section for overall, system-level control, and separate sections dedicated to performing various different specific computations, functions and other processes under control of the central processor section. The controller 206 may be a plurality of separate dedicated or programmable integrated or other electronic circuits or devices (e.g., hardwired electronic or logic circuits such as discrete element circuits, or programmable logic devices such as PLDs, PLAs, PALs or the like). The controller 206 may be suitably programmed for use with a general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the procedures described herein can be used as the controller 206. A distributed processing architecture can be used for maximum data/signal processing capability and speed.

Figure 3:
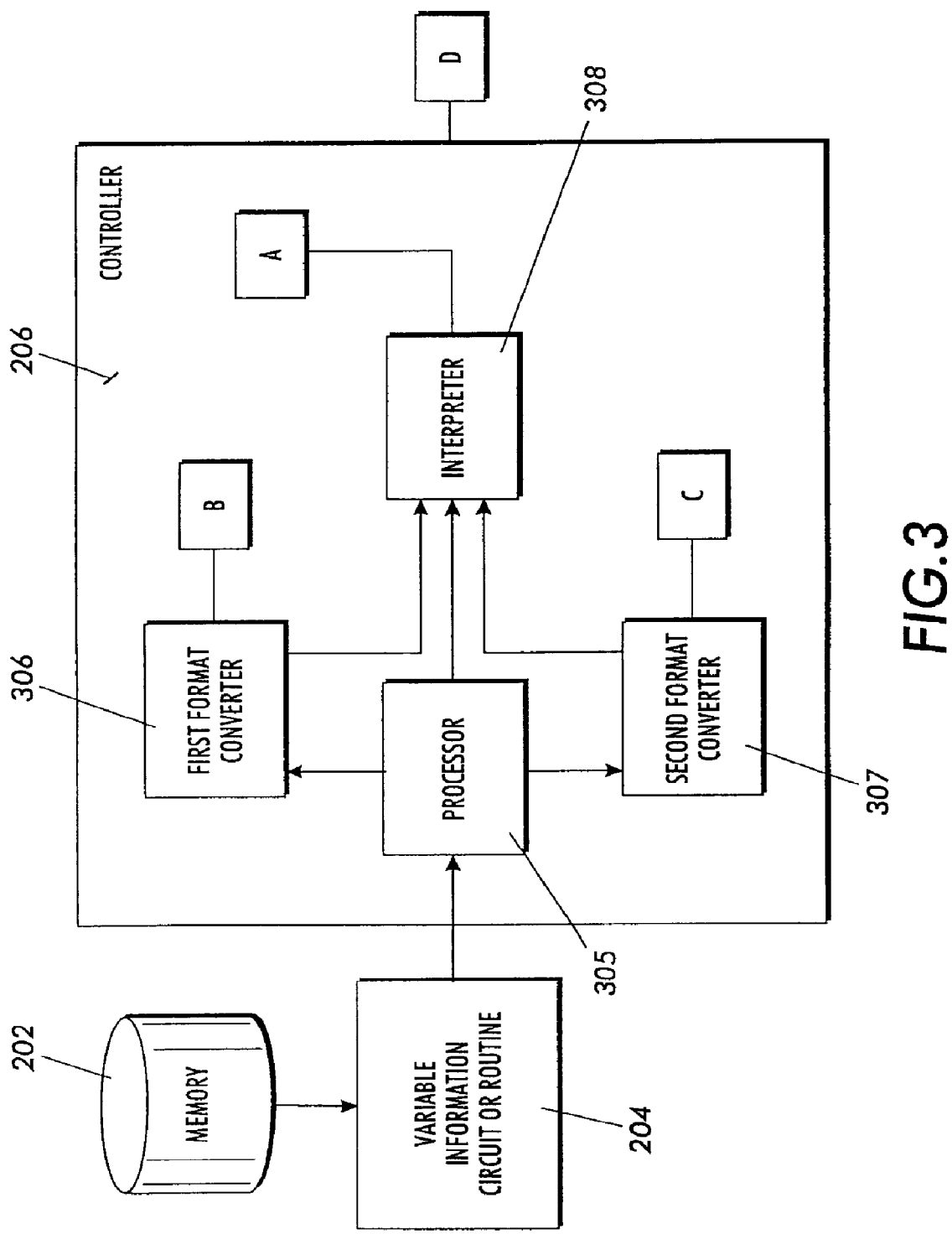
FIG. 3 is an exemplary detailed diagram of the controller shown in FIG. 2.

It should be appreciated that the architectures in FIGS. 1-3 are exemplary only. Other architectures of the components may be used without departing from the spirit and scope of the present invention.

FIG. 3 is an exemplary detailed diagram of the controller 206 shown in FIG. 2. As shown in FIG. 3, variable information used to personalize each print job may be received from a variable information source that may be part of the memory 202. The variable information source may also be a customer IT system or any other storage or generation device for providing variable information. The controller 206 may control the variable information circuit or routine 204 to create variable documents to be printed by combining fixed data with the variable information and guided by a design layout. Then controller 206 may control the printing system 100 to output the documents to the printer for printing. The printing system 100 may include a digital color printer having a Digital Front End (DFE).

A single variable information job submission may typically produce an output targeted for many individual recipients. Each set of output within the single variable information job may be defined as a sample set. The processing of this type of print job submission to the DFE of conventional processors cannot recreate the many individual sample sets that a variable information job may contain should data be lost or damaged. Thus, the processing system 104 includes features related to both variable information production and reproduction. For example, the processing system 104 may comprehend individual sample sets within the variable information print job coupled with variable information production and/or reproduction features in order to simplify and support many variable information workflows and provide many potential vectors of differentiation (VODs). The processing system 104 may be positioned directly in front of a production printer to play a central role in the variable information workflow. The processing system 104 may interface with all upstream production processes and then efficiently convert them into the machine language of the marking engine. The processing system 104 may share a common hardware platform and common software architecture so that end users see a common graphical-user-interface. One example of a controller that may be used is the DocuSP® Controller along with the circuits or routines discussed below.

The controller 206 shown in FIG. 3 may include a first format converter 306, second format converter 307, interpreter 308 and circuits or routines A-D. The circuits or routines A-D may be an application. As discussed above, the controller 206 may control the variable information circuit or routine 204 to create variable documents to be printed by the printing system 100. The source of the variable information may be in the memory 202. The first format converter 306 may convert the variable information generated print job to, for example, a PostScript Descriptive Language® (PDL) format, e.g., PPML2PS. The second format converter 307 may convert the variable information generated print job to, for example, a Variable Data Intelligent PostScript Printware (VIPP) print job. VIPP is based on PostScript® but extends the PostScript® programming language with a job prolog that describes layout functions that occur in the printer. PDL and VIPP are shown for exemplary purposed only. It should be appreciated that the first format converter 306 and second format converter 307 may convert the variable information generated print job to any known format without departing from the spirit and scope of the invention. The interpreter 308 may receive the PDL or VIPP formatted print job and process the print job to create the data stream for either format. The processor 305 may be a format determination circuit or routine to determine the appropriate format converter to be used for the print job.

The circuit or routine A may enhance the controller 206 to accept a sample set that delimits "extensions" to the sample set. For example, the application A may create new PDL operators as an extension, e.g., "StartSampleSet/EndSampleSet," to create an interface for the controller 206 to provide PPML2PS and VIPP Core usage. The sample set that delimits this information as the extension should be captured as part of a "save" job. This information should also be available for the Reprint Manager so that it may provide features based on the additional save job data. The circuit or routine A should allow the controller 206 to process the file submission including the extensions. The circuit or routine A may also be implemented without any dependencies on the other circuits or routines B-D.

The circuit or routine B may enhance the format conversion process to leverage the sample set that delimits the extensions. For example, the Personalized Print Markup Language (PPML) file organization may be used to separate DOCUMENT_SETs/JOBs as individual sample sets. PPML is an open source Extensible Markup Language (XML) application for variable information printing that is supported by common digital production equipment.

The circuit or routine C may be used to enhance the format conversion to leverage the sample set that delimits the extensions. For example, the circuit or routine C may be used to create new VIPP commands that will use the new PDL operators of circuit or routine A. These new commands may be created by mapping new VIPP STARTSAMPLESET to the StartSampleSet used with the DocuSP® Controller. Furthermore, the new VIPP ENDSAMPLESET may be mapped to the EndSampleSet used with the DocuSP® Controller. In an alternative embodiment, the format conversion database and any processing may be enhanced to automatically place the sample set delimiting new operators in the resulting data stream sent to the processor rip. With VIPP, this process would not require the creation of the new VIPP STARTSAMPLESET and VIPP ENDSAMPLESET commands. Thus, there may be a reduction in processing since the internal VIPP Core modification would use the new delimiting operators only when appropriate. The enhancement of the VIPP Core may be configured to be selectable allowing a user to choose either automatically delimit the extensions or not to automatically delimit the extensions.

Figure 6:
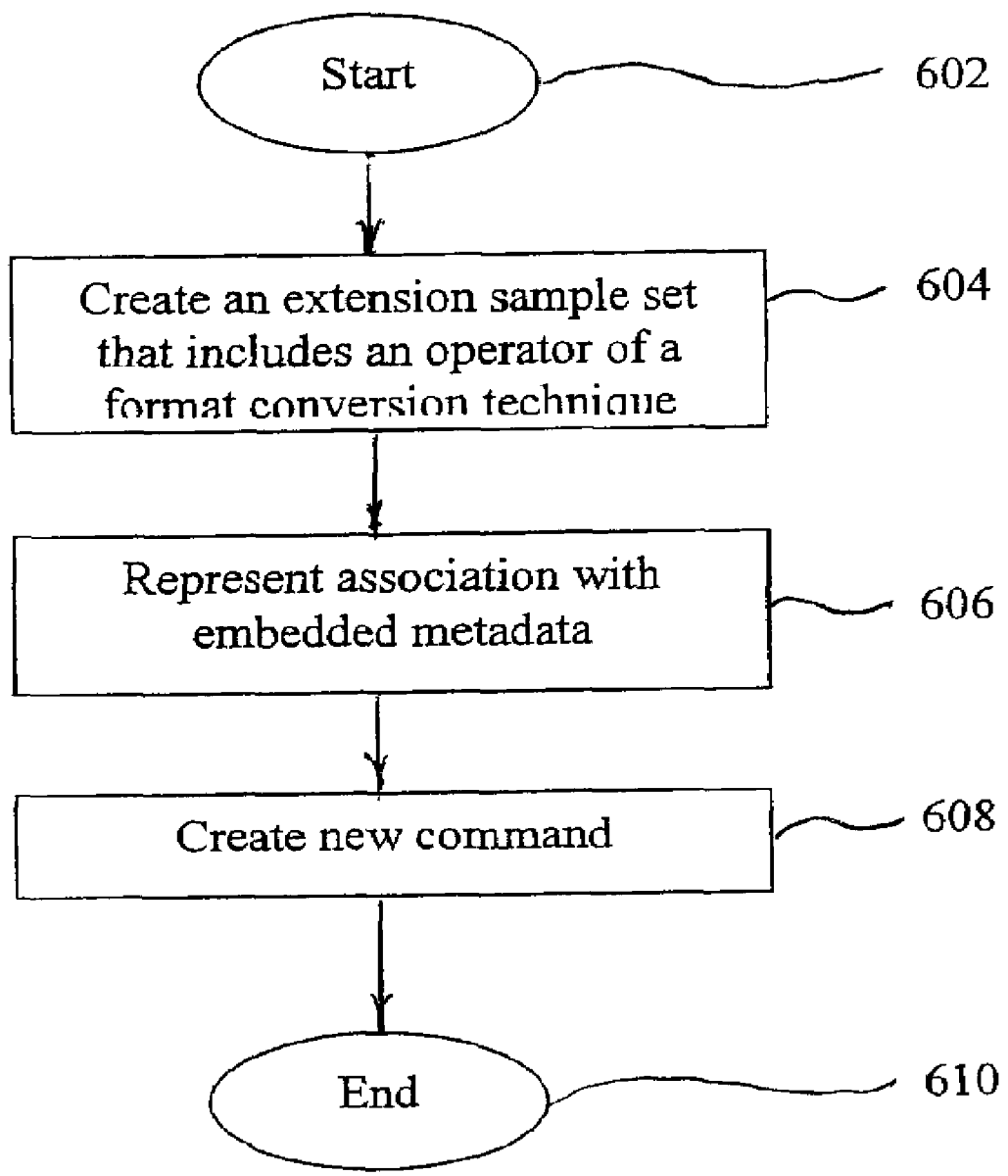
FIG. 6 is an exemplary flow chart showing a method of creating an extension to a sample set.

FIG. 6 shows an exemplary method for creating an extension to a sample set and creating a new command. For example, after step 602, an extension can be created to a sample set at step 604 as discussed above for circuit or routine A. The index/association relating to the extension to the sample set can then be represented with embedded metadata at step 606 and a new command to leverage the sample set can be created at step 608, such as discussed for circuit or routine C. The method ends at step 610.

While the circuits or routines A-C may provide an infrastructure for a numerical sequence based on the sample set features, the circuit or routine D may be used to "enhance" the processor with a numerical sequence based on the sample set features. Moreover, any features utilizing the sample set delimiting enhancement may be available for VIPP and PPML submissions. The controller 206 may implement additional features that leverage the enhancement. For example, the print submission may first be printed with an associated sample set list that includes a logical sequence of data such as a numerical, sequence-based range list. For example, 1, 10, 201-205 may be used to print all of the output pages associated with sample set 1, 10, 201, 202, 203, 204 and 205. The list may be communicated through a job ticket, VIPP and/or a graphical user interface (GUI).

Figure 7:
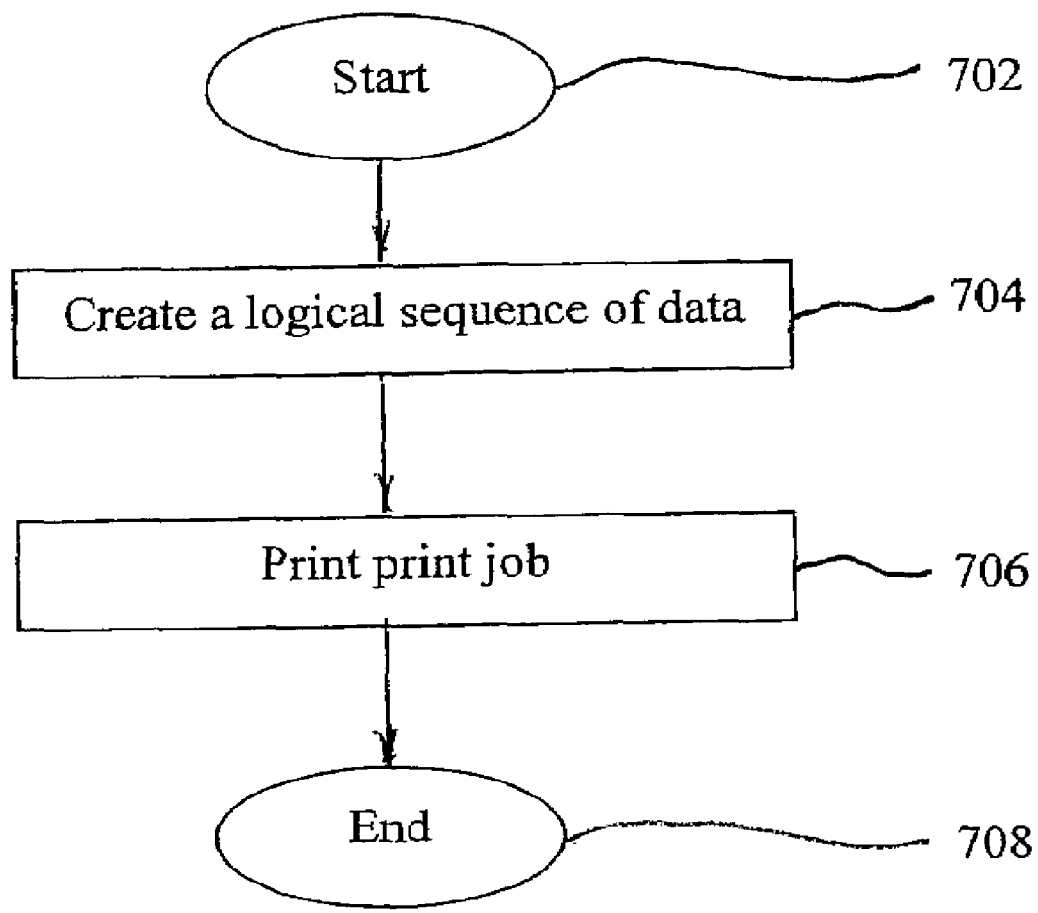
FIG. 7 is a exemplary flow chart showing a method of creating a logical sequence of data.

FIG. 7 is a flowchart showing an exemplary method for creating a logical sequence of data. After step 702, a logical sequence of data can be created at step 704, such as discussed above, and, at step 706, the print job can be printed in which the output pages are associated with a sample set list that includes the logical sequence of data. The method ends at step 708.

Moreover, the print submission may be printed with the associated sample set list of data. This feature may also provide some information about the variable information job that is selected for printing such as the number of sample sets, number of pages within each sample set, etc. The Reprint Manager GUI may provide a display of the sample set structure so that a user may select the sample sets to be printed. This feature should include saving the modified jobs with respect to the amount/type of data included in sample set and the ability of the Reprint Manager to access the information. The circuit or routine D may allow the controller 206 to use an original PDL file to resubmit and reprint only specified pages instead of regenerating an entirely new PDL file.

Based on the features discussed above with respect to FIG. 3, the circuit or routine A may be used to enhance the sample set that was delimited with the extension to associate index/metadata with each sample set. The circuit or routine B may be used to enhance the format conversion to utilize the index/metadata association that exists with each sample set.

The circuit or routine C may be used to enhance the controller 206 with the index/metadata embedding for the sample sets. For example, the initial print submission of the variable information print job may present index/metadata fields that may accept values for the fields of index/metadata supplied in the data stream. The values may be used to exclude certain sample sets from being printed, to identify which sample sets should be printed or a combination of both options. If PDL is used, this feature may require more PDL operators or DSCs with the ability to communicate exactly which fields of index/metadata are being provided.

The Reprint Manager may present the index/metadata fields associated with a selected variable information print job. The Reprint Manager may also accept values for one or more fields of the index/metadata and may present information back to the user to allow the user to see which sample sets match the provided field values. The full set of index/metadata should be displayed for each matched sample set to allow the user to select the desired sample sets from the matched sample set list. The circuit or routine C may also provide the index/metadata in an output file for an application level validation of transactions and records that have been printed. This data may be augmented with additional print processing information on a per sample set basis. For example, the data may be augmented when the sample set and the number of impressions for the sample set were printed.

The circuit or routine D may be used to enhance the format converters 306 and 307 so that they may parse metadata tags and embed the appropriate extension to associate the metadata with the sample sets. Is should be appreciated that the systems and methods discussed above may be used by a user to recreate any project or portion thereof of a project, for example, by associating embedded metadata with a particular sample set. For example, a user could identify a social security number associated with a particular sample set and command the printing system 100 to regenerate only the sample set that includes the identified social security number. It should also be appreciated that the user could use any stored and embedded metadata to regenerate a sample set without departing from the spirit and scope of the invention.

Figure 4:
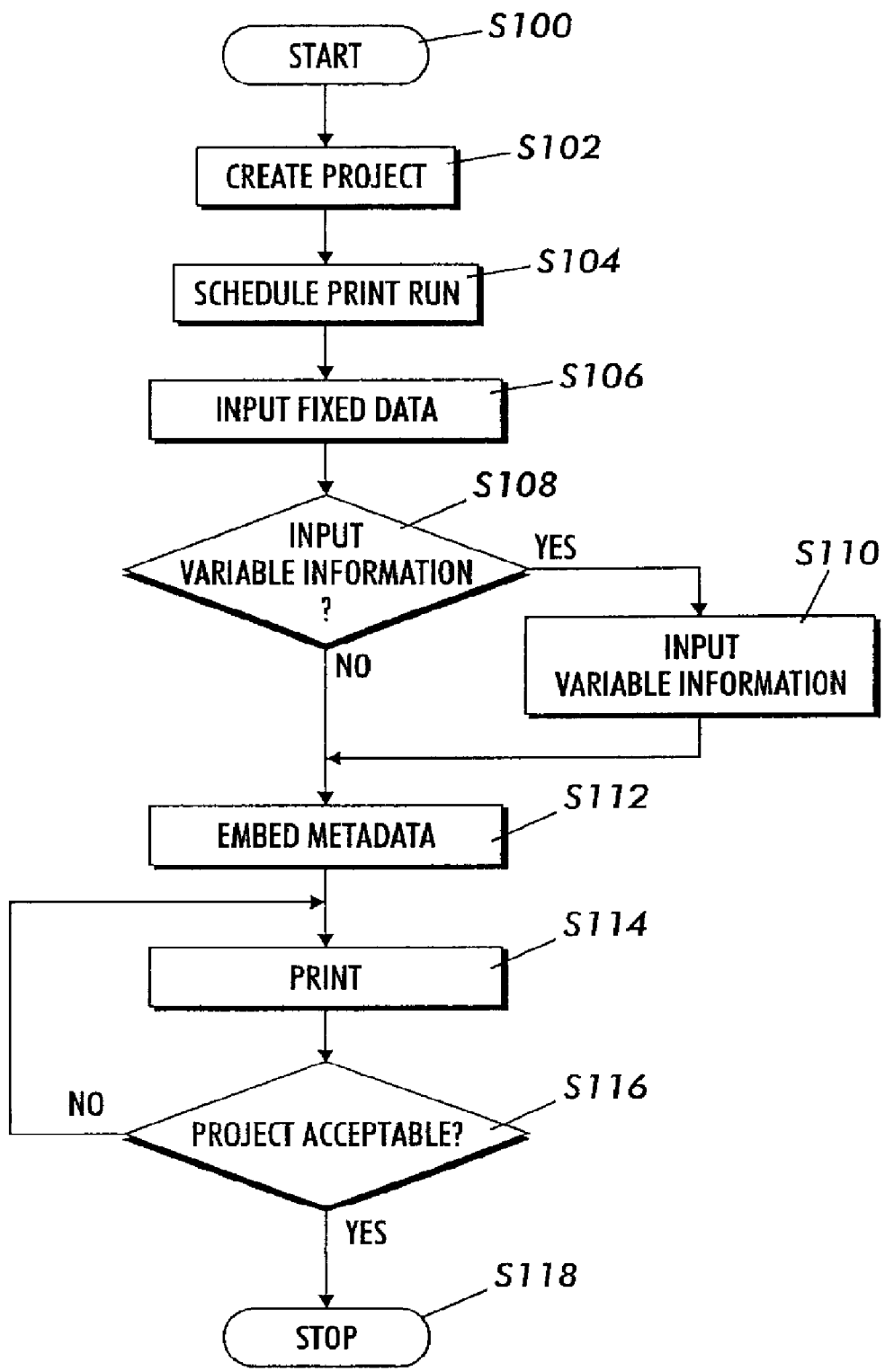
FIG. 4 is an exemplary flowchart showing a method of using a printing system to embed metadata.

FIG. 4 is an exemplary flowchart showing a method of associating metadata with a print job. After control begins in S100, control shifts to S102 where a project is created. Next, in S104, a print run is scheduled to print the project. Then, in S106, fixed data is inputted into the project print job. Next, control shifts to S108 where it is determined whether variable information should be inputted into the project print job. If it is determined in S108 that variable information should be inputted into the print job, then control shifts to S110 where the variable information is inputted into the print job. Then, controls shifts to S112. If it is determined in S108 that no variable information will be inputted into the print job, the control shifts directly to S112. In S112, metadata is embedded into the print job. In S114 the project is printed. Then, in S116, it is determined whether the printed project is acceptable. If it is determined that the printed project is not acceptable in S116, then control shifts back to S114 where a portion of the print job may be reprinted. If it is determined in S116 that the printed project is acceptable, then control shifts to S118 where control ends.

While the invention has been described in conjunction with exemplary embodiment, these embodiments should be viewed as illustrative, not limiting. Various modifications, substitutes, or the like are possible within the spirit and scope of the invention.

What is claimed is:

1. A printing system that prints a print job, comprising:
   a memory that stores information including at least metadata;
   a printer that prints the print job; and
   a controller that (1) controls the printing system to embed the metadata into a data stream for the print job, (2) controls the printer to print the print job, and (3) when the production of a portion of the print job is not acceptable, controls the printer to reprint the portion of the print job based on the embedded metadata,
   the portion of the print job including a sample set, and
   the embedded metadata including data that enables the printer to regenerate the sample set.

2. The printing system of claim 1, further comprising one of a variable information circuit and a routine stored on the printing system, the variable information circuit and the routine, when executed by the printing system, being controlled by the controller to embed variable information into the data stream for the print job.

3. The printing system of claim 2, further comprising one of a fixed data circuit and a routine stored on the printing system, the fixed data circuit and routine, when executed by the printing system, being controlled by the controller to embed fixed data into the data stream for the print job.

4. The printing system of claim 1, wherein the metadata includes raw data containing information about the data stream for the print job.

5. The printing system of claim 1, further comprising one of a first circuit and a first routine stored on the printing system, the first circuit and the first routine, when executed on the printing system, creating and causing the printing system to create, respectively, an extension to at least one sample set, the extension being a new operator of a format conversion technique and representing the association with the embedded metadata.

6. The printing system of claim 5, further comprising one of a second circuit and a second routine stored on the printing system, the second circuit and the second routine, when executed on the printing system, creating and causing the printing system to create, respectively, a new command that uses the new operator of the format conversion technique.

7. The printing system of claim 6, wherein the controller is configured to be controlled to create a logical sequence of data based on a plurality of sample sets, and then to control the printer to print the print job with an associated list that includes the logical sequence of data.

8. The printing system of claim 1, wherein the portion of the print job that is reprinted is less than the entire print job.

9. A method of using a printing system that prints a print job, comprising:
   storing information including at least metadata;
   controlling the printing system to embed the metadata into a data stream for the print job;
   printing the print job; and
   when the production of the print job is not acceptable, reprinting a portion of the print job based on the embedded metadata,
   the portion of the print job including a sample set, and
   the embedded metadata including data that enables the sample set to be regenerated.

10. The method of using the print system of claim 9, further comprising embedding variable information into the data stream for the print job.

11. The method of using the print system of claim 9, further comprising embedding fixed data into the data stream for the print job.

12. The method of using the print system of claim 11, further comprising
   creating an extension to the at least one sample set, the extension being a new operator of a format conversion technique and
   representing the association with the embedded metadata.

13. The method of using the print system of claim 12, further comprising creating a new command that uses the new operator of the format conversion technique.

14. The method of using the print system of claim 13, further comprising
   creating a logical sequence of data based on a plurality of sample sets; and
   printing the print job with an associated list that includes the logical sequence of data.

15. The method of using the print system of claim 9, wherein the metadata includes raw data containing information about the data stream for the print job.

* * * * *